(12) United States Patent
Provost

(10) Patent No.: US 9,767,468 B2
(45) Date of Patent: Sep. 19, 2017

(54) SYSTEM, METHOD AND COMPUTER-ACCESSIBLE MEDIUM FOR PREDICTING PRIVATE TRAITS FROM DIGITAL INDICATORS

(71) Applicant: NEW YORK UNIVERSITY, New York, NY (US)

(72) Inventor: Foster Provost, New York, NY (US)

(73) Assignee: New York University, New York, NY (US)

( * ) Notice: Subject to any disclaimer, the term of this patent is extended or adjusted under 35 U.S.C. 154(b) by 65 days.

(21) Appl. No.: 14/632,328

(22) Filed: Feb. 26, 2015

(65) Prior Publication Data

US 2015/0242653 A1 Aug. 27, 2015

Related U.S. Application Data

(60) Provisional application No. 61/945,041, filed on Feb. 26, 2014.

(51) Int. Cl.
| | | |
|---|---|---|
| *G06F 21/62* | (2013.01) | |
| *G01N 5/04* | (2006.01) | |
| *G06Q 30/02* | (2012.01) | |
| *G06F 21/60* | (2013.01) | |

(52) U.S. Cl.
CPC ............ *G06Q 30/02* (2013.01); *G06F 21/60* (2013.01)

(58) Field of Classification Search
None
See application file for complete search history.

(56) References Cited

U.S. PATENT DOCUMENTS

| 7,065,525 B1* | 6/2006 | Sasaki | G06F 17/30867 369/13.01 |
|---|---|---|---|
| 8,694,893 B2* | 4/2014 | Bagley | G06Q 30/02 705/26.5 |
| 9,195,945 B2* | 11/2015 | Liu | G06N 5/04 |
| 2010/0024042 A1* | 1/2010 | Motahari | G06F 21/577 726/26 |
| 2010/0114920 A1* | 5/2010 | Srivastava | G06F 21/6254 707/757 |
| 2010/0257035 A1* | 10/2010 | Karmon | G06Q 30/0208 705/14.11 |
| 2011/0022477 A1* | 1/2011 | Hatridge | G06Q 30/02 705/14.67 |
| 2011/0099046 A1* | 4/2011 | Weiss | G06Q 10/00 705/7.31 |

(Continued)

OTHER PUBLICATIONS

Bachrach, Y., et al. Personality and patterns of face book usage. In proceedings of the 3rd annual ACM web science conference, ACM, pp. 24-32 (2012).

(Continued)

*Primary Examiner* — Christopher Revak
(74) *Attorney, Agent, or Firm* — Andrews Kurth Kenyon LLP

(57) ABSTRACT

Exemplary systems, methods, and computer-accessible mediums can be provided to manage a preferences associated with a user, which can include receiving information related the preferences of a user(s), determining if an inference(s) about the user(s) can be drawn from the preferences to generate further data, remove a particular preference from the preferences based on the further data, further determining if the inference(s) continues to be drawn.

22 Claims, 10 Drawing Sheets

(56) References Cited

U.S. PATENT DOCUMENTS

| | | | | |
|---|---|---|---|---|
| 2012/0095976 | A1* | 4/2012 | Hebenthal | G06F 17/30867 707/706 |
| 2014/0245452 | A1* | 8/2014 | Hurwitz | H04L 63/04 726/26 |
| 2015/0142888 | A1* | 5/2015 | Browning | H04L 12/1831 709/204 |

OTHER PUBLICATIONS

Harald Schoen, et al. The power of prediction with social media. Internet Research, vol. 23 Iss: 5, pp. 528-543, (2013).
House, W. Consumer data privacy in a networked world: A framework for protecting privacy and promoting innovation in the global economy. Washington, D.C.: White House, (2012).
Johnson M., et al. Facebook and privacy: It's complicated. Symposium on Usable Privacy and Security (SOUPS), (2012).
Junque de Fortuny, et al. Predictive modeling with big data: is bigger really better? Big Data 1, 4, pp. 215-226 (2013).
Knijnenburg B.P. et al. Counteracting the negative effect of form auto-completion on the privacy calculus. 34th International Conference on Information Systems, Milan (2013).
Kosinski, M., et al. Private traits & attributes are predictable from digital records of human behavior. Proc. of the Nat'l Academy of Sciences 110, 15, pp. 5802-5805 (2013).
Martens, D. and Provost, F. Explaining documents' predicted classifications. MIS Quarterly 38(1), 73-99, (2014).
Pavlou, P. A. State of the information privacy literature: where are we now and where should we go. MIS quarterly 35, 4, pp. 977-988, (2011).
Smith, H. J., et al. Information privacy research: an interdisciplinary review. MIS quarterly 35, 4, pp. 989-1016 (2011).
Perlich, C., et al. Machine learning for targeted display advertising: Transfer learning in action. Machine learning 95, 1, pp. 103-127 (2014).
Schwartz, H. A., et al. Personality, gender, and age in the language of social media: The open-vocabulary approach. PloS one 8, 9, pp. e73791 (2013).

* cited by examiner

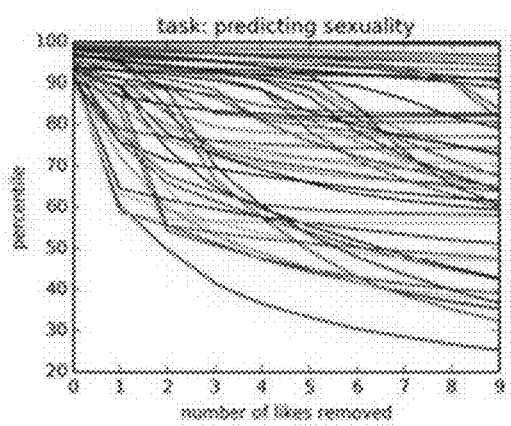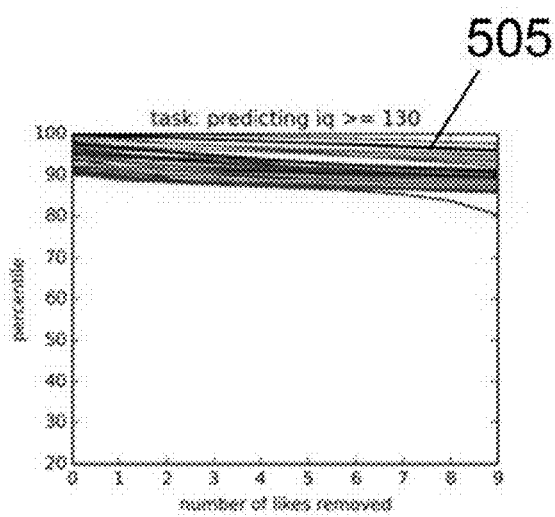
Figure 5A
Figure 5B

SYSTEM, METHOD AND COMPUTER-ACCESSIBLE MEDIUM FOR PREDICTING PRIVATE TRAITS FROM DIGITAL INDICATORS

CROSS-REFERENCE TO RELATED APPLICATION(S)

This application relates to and claims priority from U.S. Patent Application No. 61/945,041, filed on Feb. 26, 2014, the entire disclosure of which is incorporated herein by reference.

FIELD OF THE DISCLOSURE

The present disclosure relates generally to internet privacy, and more specifically, to exemplary embodiments of exemplary system, method and computer-accessible medium for predicting private traits, and recommending which public traits should be hidden to prevent one or more predictions of the private traits.

BACKGROUND INFORMATION

Analytics of privacy often focus on issues of data confidentiality. However, additionally important to individual privacy can be inferences that can be drawn about each of us, for example, by predictive models that can be based on seemingly benign data. Recent studies have explored the predictive power of information disclosed on social networks, such as Facebook® ("Facebook"), to infer users' personal characteristics. In particular, it has been shown that analyzing the pages that a user "Likes" on Facebook can be used to predict characteristics, such as their personality traits, their age or their sexual orientation. These results can be surprising, and can be viewed as privacy intrusions to users who do not wish to reveal their personal characteristics.

Privacy in social media is becoming an increasing concern for consumers, regulators and policy makers. A recent study based on a survey of Facebook users found that users did not feel that they had the appropriate tools to mitigate their privacy concerns within their social network connections. One source of concern can be the extent of the inferences which can be drawn using social media. Previous work has explored the revealing nature of disclosing personal taste-oriented information in online social networks. Various personal characteristics, including intelligence, introversion/extroversion, sexual orientation, and the like, can be predicted with surprising accuracy based on the "Likes" one reveals on Facebook. Facebook has tied the previously free-response based favorite movies, television shows, and music sections of a user's profile to these "Likes", creating quantifiable connections from users to additional pages. These "Liked" pages can be utilized to predict personal characteristics that a user may not want to disclose on their Facebook profile.

To many, privacy invasions via inference by predictive models can be at least as troublesome as privacy invasions based directly on primary data. There is some evidence that when given the appropriate tools, people may trade off the benefit of their online activity with their privacy concerns.

Various pricing strategies, marketing campaigns and political campaigns can rely on the ability to correctly estimate potential customers' or voters' preferences. This can generate incentives for firms and governments to acquire information related to people's personal characteristics, such as their gender, marital status, religion, sexual or political orientation. The boom in availability of online data has accentuated their efforts to do so. However, personal characteristics often can be difficult to determine directly, and with certainty, because of privacy restrictions. Thus, marketers increasingly rely on statistical inferences based on available information. A predictive model can be used to give each user a score that can be proportional to the probability of having a certain personal trait, such as being gullible, introverted, female, a drug user, gay, etc. (See, e.g., Reference 8) Users can then be targeted based on their predicted propensities and the relationships of these inferences to the particular campaign. Alternatively, such characteristics can be used implicitly in campaigns, based on feedback from those who responded positively. In practice, a combination of model confidence and a budget for showing ads can lead campaigns to target users in some top percentile of the score distribution given by the predictive models. (See, e.g., Reference 13).

Traditionally, online user targeting systems have been trained using information on users' web browsing behavior. (See, e.g., Reference 14). However, a growing trend can be to include information disclosed by users on social networks. (See, e.g., Reference 1). For example, Facebook has recently deployed a system that can facilitate third party applications to display advertisements on their platform using their users' profile information, such as the things they explicitly indicate that they "Like." (See, e.g., Reference 2).

While some online users can benefit from being targeted based on inferences of their personal characteristics, others can find such inferences unsettling. Not only can these inferences be incorrect due to a lack of data or inadequate models, some users may not wish to have certain characteristics inferred about them at all. In response to an increase in demand for privacy from online users, suppliers of browsers such as Chrome and Firefox have developed features such as "Do Not Track," "Incognito," and "Private Windows" to control the collection of information about web browsing. However, as of now, social networks such as Facebook do not have a strong analog to these features which can facilitate transparency and control over how user information can be used to decide on the presentation of content and advertisements.

Thus, it may be beneficial to provide an exemplary system, method and computer-accessible medium that can facilitate the ability for a user to regulate their privacy on the internet by examining inferences that can be made based on a user's "Likes", as well as to address at least some of the deficiencies described herein above.

SUMMARY OF EXEMPLARY EMBODIMENTS

Thus, exemplary systems, methods, and computer-accessible mediums according to exemplary embodiments of the present disclosure can be provided to manage a preferences associated with a user, which can include receiving information related the preferences of a user(s), determining if an inference(s) about the user(s) can be drawn from the preferences to generate further data, remove a particular preference from the preferences based on the further data, further determining if the inference(s) continues to be drawn. For example, a recommendation can be generated to inform the user(s) to remove the particular preference(s) if the inference(s) to be drawn. The preferences can include a plurality of likes of content(s). The inference(s) can include a gender, sexuality, or an intelligence quotient. The preferences ca include inference preferences used an inference procedure(s).

In some exemplary embodiments of the present disclosure, the inference(s) can be drawn using a predictive model, which can include a logistic regression model. The predictive model can include (i) a support vector machine(s), (ii) a neural network(s), (iii) a tree-structured model(s), (iv) a rule-based model(s) and/or (v) a Bayesian model(s). The regressors of the logistic regression model can include the preferences associated with the user(s). The removing procedure can include removing a plurality of particular preferences, one at a time, until the inference(s) can no longer be drawn.

In certain exemplary embodiments of the present disclosure, the particular preferences can be selected based on, e.g., a minimum cost cloaking value, which can be determined based on a cost to the user of the particular preferences. The inference(s) can be determined based on a matrix(es) of a plurality of users and a plurality of respective preferences. The inference(s) can be determined based on a singular-value decomposition (SVD) of the matrix(es), and/or by choosing a particular amount of SVD dimension vectors as modeling dimensions. In some exemplary embodiments of the present disclosure, the particular amount can be about 100.

In one exemplary variant, the inference(s) can be determined based on a logistic regression model(s) that can use the particular amount of SVD dimensions. The logistic regression model(s) can be converted into a simple linear logistic regression model that uses the respective preferences. The preferences can include information posted on a social networking website(s). The information can be (i) privately available only to the social networking website(s), (ii) publically available and/or (iii) partially publically available. A selection of a particular preference(s) to be removed from the preferences can be received.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which:

FIGS. 5A and 5B are a set of even further exemplary graphs illustrating a reduction in probability when "Likes" are removed from a user's online profile according to still another exemplary embodiment of the present disclosure;

Figures 1A, 1B:
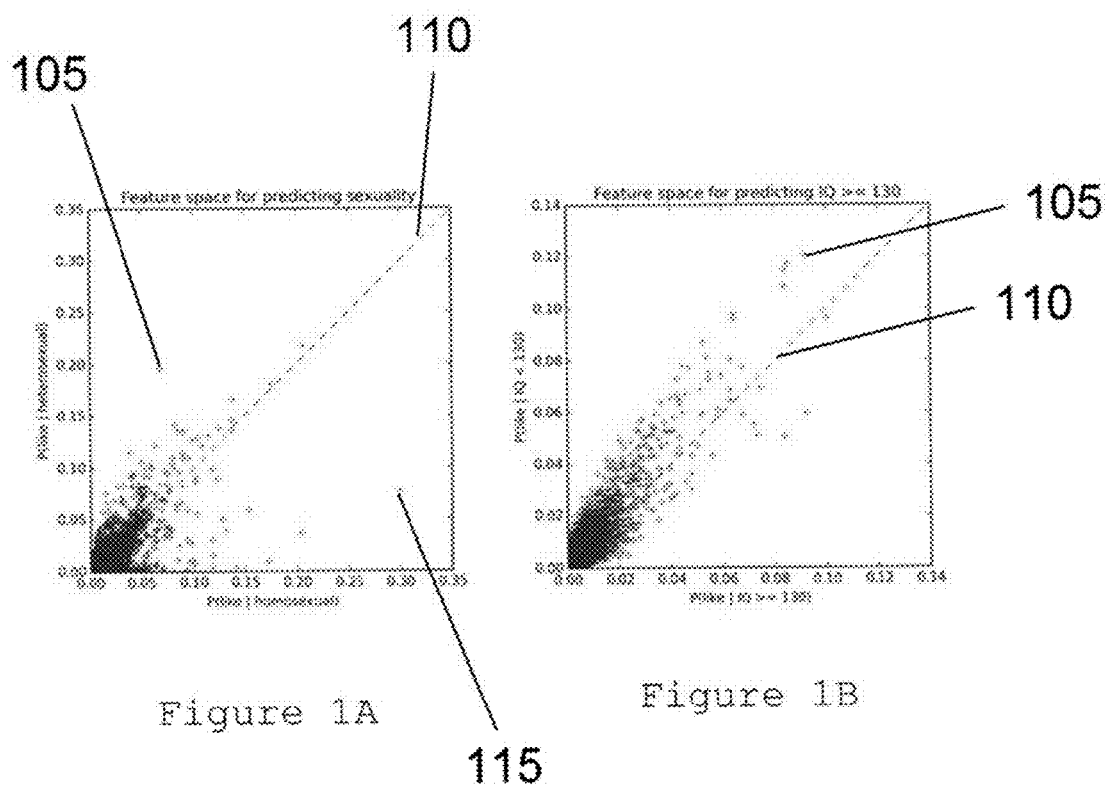
FIGS. 1A and 1B are exemplary graphs illustrating feature space prediction according to an exemplary embodiment of the present disclosure.

Throughout the drawings, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments and is not limited by the particular embodiments illustrated in the figures and appended claims.

DETAILED DESCRIPTION OF EXEMPLARY EMBODIMENTS

The exemplary system, method and computer-accessible medium, according to an exemplary embodiment of the present disclosure, can utilize counterfactual evidence as a method for providing transparency into exemplary reason(s) why particular inferences can be drawn about them. The exemplary counterfactual evidence can be based on the likelihood that a person may want to know why certain inferences were drawn. For example, what can be a minimal set of evidence such that, if it had not been present, the inference would not have been drawn? (See, e.g., Reference 10). Additionally, e.g., assume that Manu has been determined by the system's inference procedure to be gay, based on the things that Manu has chosen to "Like". (See, e.g. Reference 3). What can be a minimal set of "Likes" such that, after their removal, Manu would no longer be classified as being gay?

The exemplary system, method and computer-accessible medium, according to an exemplary embodiment of the present disclosure, can utilize a "cloaking device" to provide and examine a control over various inferences. For example, the exemplary cloaking device can provide a mechanism for users to inhibit the use of particular pieces of information in inferences; combined with the transparency provided by the counterfactual evidence, a user could control model-driven inferences. The user can cloak particular information from being used in inference or in an inference procedure (e.g., the user can cloak inference preferences which can be the inferences that are used in the inference procedure), without having to stop sharing the information with his social network friends. The user can also remove the information entirely from the social networking website. This can facilitate an exemplary control with a minimal amount of disruption to the user's normal activity.

Information or preferences can include information that is publicly available to any person viewing the social networking website. The information can also include information that is only available to the social networking website (e.g., private information). Alternatively, or in addition, the information can include partially publicly or privately available (e.g., information that is a combination of private information and information publicly available to a subset of people, for example, social networking friends of the user)

The exemplary system, method and computer-accessible medium, according to an exemplary embodiment of the present disclosure, can utilize these analytical tools and/or procedures to provide information and/or answer at least two questions: (i) how much information must users cloak in order to significantly affect inferences about their personal traits? It has been determined that generally the user does not need to cloak the majority of his/her actions in order to inhibit the inference. It was also determined that false positive inferences can generally be easier to cloak than true positive inferences, and (ii) Can firms change their modeling behavior to make cloaking more difficult? In the exemplary results, various procedures for modeling personal traits can be used, and a simple modeling change that can still give accurate inferences of personal traits, and may need users to cloak substantially more information to affect the inferences drawn. Firms can provide transparency and control even into very complicated, predictive model-driven inferences, and can make modeling choices to make control easier or harder for their users.

The exemplary system, method and computer-accessible medium according to an exemplary embodiment of the present disclosure can examine the following issues:
(i) Are some of behaviors/taste indicators more predictive than others?
(ii) Can a user predicted to have a particular personal characteristic modify his/her profile to change that prediction?
(iii) To what extent can inferences be made about users when utilizing information they may not be directly able to modify (e.g., namely, their friends' personality traits and profile information).

Some traits (e.g., preferences, likes, endorsements, etc.) can be predicted with high accuracy using various user Facebook "Likes" (e.g., likes of various types of content, which can include web pages, music, movies etc.). In addition, the discriminative power of "Likes" can vary greatly between different user characteristics, and the corresponding modification of a user's profile can afford varying degrees of success in hiding from an inference. Utilizing network features, similar predictive power can be found when compared to using a user's own "Likes".

An exemplary dataset can be used to model inference scenarios. The predictive and discriminative power of exemplary models, utilizing an exemplary cloaking device, can facilitate users to hide from the results drawn about their personal characteristics. Building on the exemplary cloaking device, the scope of the exemplary inference models can be extended to utilize network information inherently present in social networks.

Exemplary Data

The exemplary dataset can contain the Facebook "Likes" and personal characteristics (e.g., demographic information, preference information, and the results of several psychometric tests) for all users. A user with fewer than thirty-two "Likes" can be discarded from the data. The exemplary data is shown in Table 1 below.

TABLE 1

Descriptive statistics for three user characteristics.

| | Gender | | | Homosexuality | | | IQ ≥ 130 | | |
|---|---|---|---|---|---|---|---|---|---|
| | Positive (N = 74,559) Mean (SD) | Negative (N = 44,221) Mean (SD) | t-statistic | Positive (N = 866) Mean (SD) | Negative (N = 17,790) Mean (SD) | t-statistic | Positive (N = 269) Mean (SD) | Negative (N = 1,804) Mean (SD) | t-statistic |
| Number of Likes | 281.750 (431.79) | 197.980 (285.180) | 36.36*** | 228.859 (342.985) | 217.656 (310.355) | 1.031 | 167.989 (215.220) | 252.361 (367.286) | 3.67*** |
| Number of Friends | 275.798 (258.688) | 265.279 (267.718) | 6.69*** | 279.124 (257.858) | 265.898 (256.506) | 1.48 | 199.874 (249.280) | 180.485 (216.195) | 1.34 |

*p < 0.01;
**p < 0.05;
***p < 0.001

As shown in Table 1 above, there can be no significant difference between the "Like" and friend counts for homosexual and straight users. However, the opposite can be true when comparing male and female users, where it was found that females have a larger number of "Likes" and friends. High intelligence quotient ("IQ") users tend to have fewer "Likes" when compared to low IQ users, but have no significant difference in the number of friends. Using the precise "Like" pages and friendship connections, a predictive model can be generated for these exemplary traits (e.g., gender, homosexuality, IQ or health status).

Exemplary Model

The exemplary system, method and computer-accessible medium, according to an exemplary embodiment of the present disclosure, can be used to generate a logistic regression models using "Like" pages as exemplary regressors. As an exemplary target variable, different personality characteristics can be considered.

Exemplary Predictive Power

The exemplary results of the exemplary predictive models are shown in Table 2 below.

TABLE 2

| | Gender | Homosexuality | IQ >= 130 |
|---|---|---|---|
| AUC | 0.971 | 0.904 | 0.654 |
| Accuracy | 0.918 | 0.967 | 0.871 |

Exemplary Visualization of Discriminative Power

A discrimination space can facilitate the visualization of all binary features (e.g., the "Likes") and to identify their predictiveness. FIGS. 1A and 1B illustrate exemplary graphs providing discrimination spaces for predicting sexuality or homosexuality and high IQ, respectively. Each point 105 can represent a "Like". For each "Like", the x-axis shows the prevalence in the positive samples and the y-axis shows the prevalence in the negative samples. A feature along the diagonal line 110 can have equal frequency in the positive and negative samples. In general, the further away a feature can be from the diagonal line 110, the more "predictive" it can be. Features close to the origin can be features rarely seen in the samples.

For example, liking the "Lady Gaga" page can be represented by the rightmost point 115 in FIG. 1A. This feature can have a presence frequency of 0.3 among the positive samples, but less than 0.1 among the negative samples, which can indicate that it can be relatively popular and a strong differentiator of users' sexual orientation. These discriminative spaces can be used to assist in explaining the differences in model accuracy observed in Table 2 above. The accuracy in predicting sexuality can be higher than that of predicting IQ. As seen in these discriminating spaces of FIGS. 1A and 1B, the spread of sexuality "Likes" can be seen to spread further from the diagonal 110, whereas those for IQ cluster much closer to diagonal 110.

Figures 2A, 2B:
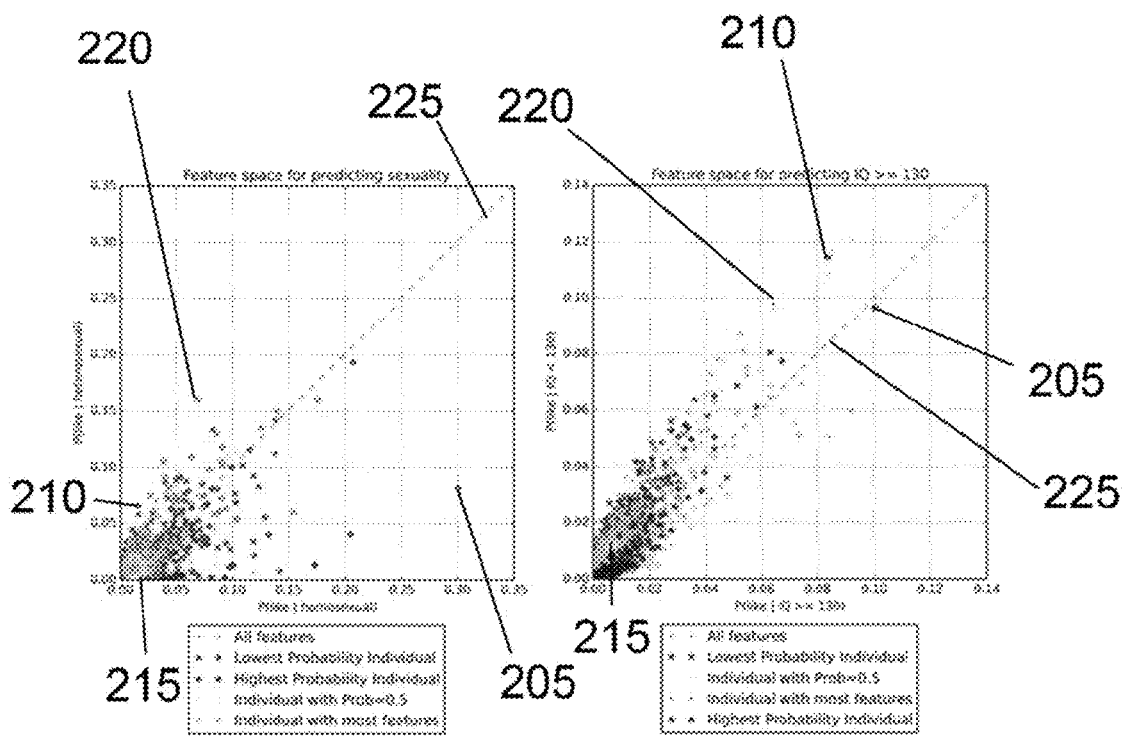
FIGS. 2A and 2B are further exemplary graphs illustrating the feature space prediction according to another exemplary embodiment of the present disclosure.
Figure 4:
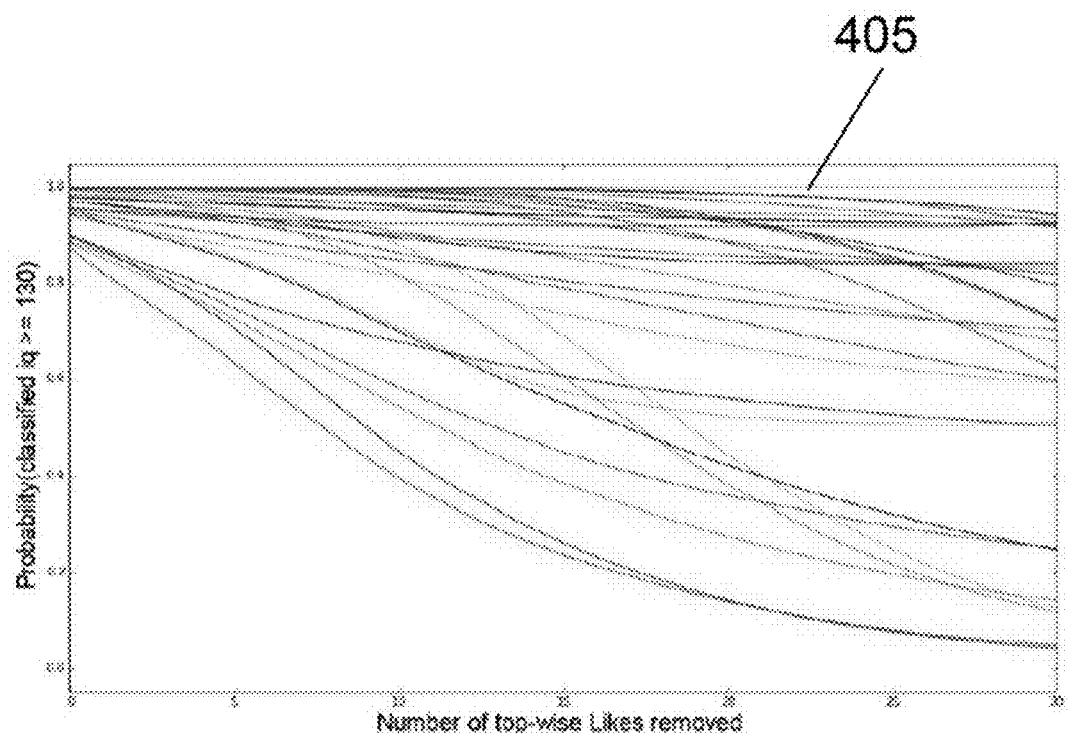

As shown in graphs of FIGS. 2A and 2B, four types of users can be overlaid into the discriminative spaces which were previously shown in FIGS. 1A and 1B. The exemplary graphs of FIGS. 2A and 2B illustrate the location of (i) the users with the highest probably (e.g., element 205) and lowest probability (e.g., element 210) of being classified positive; (ii) the user whose probability of being classified positive can be 0.5 (e.g., element 215); (iii) and the user with the most "Like" features (e.g., element 220). Users at the extremes tended to cluster on their respective side of the diagonal 225. Chance and high frequency users can be spread out across more of the discriminative space for predicting sexuality but tend to cluster on the negative side of the diagonal 225 when predicting IQ. FIGS. 2A and 2B also illustrate that a user with a high percentage of "Likes" on the positive side of the diagonal 225 can find themselves needing to remove many "Likes" with the exemplary cloaking device below before dropping substantially in their predicted probability. These users can be seen in FIGS. 4, 5A, and 5B (e.g., elements 405 and 505) as users who remained horizontal throughout the course of utilizing the exemplary cloaking device.

Exemplary Cloaking Device

In order to enhance a user's privacy, an exemplary cloaking device or procedure, according to an exemplary embodiment of the present disclosure, can be used to facilitate a user to affect the inferences drawn about them. The exemplary discriminative spaces discussed herein above can be used to understand the makeup of "Like" features when predicting various personality traits.

The exemplary cloaking device to facilitate a user to delete their "Likes". A further exemplary cloaking device and/or method can facilitate a user to hide a "Like" from predictive modeling (e.g., from targeted advertising), but still reveal the "Like" to the user's friends.

Figure 3:
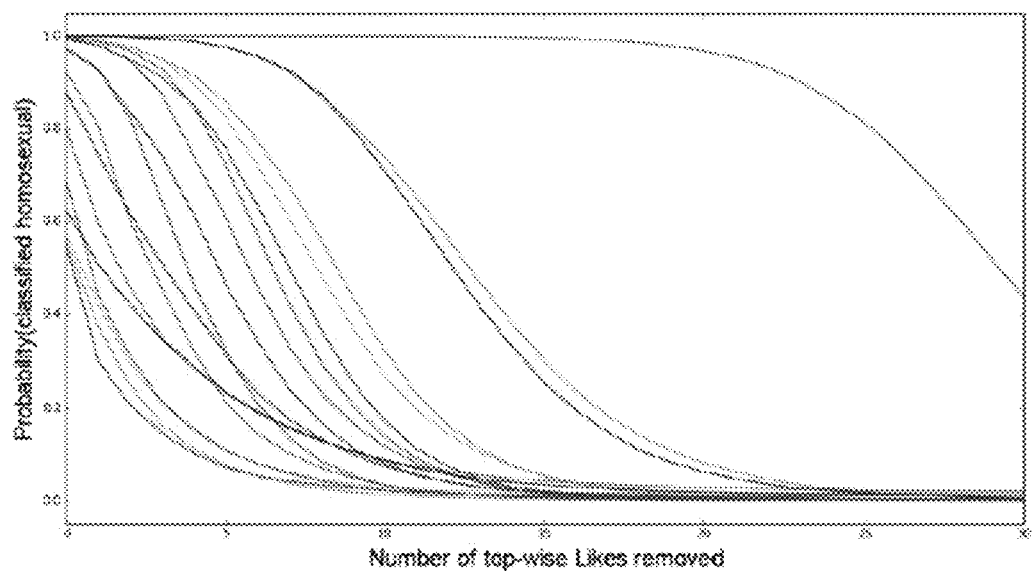
FIGS. 3 and 4 are exemplary graphs illustrating a reduction in probability when "Likes" are removed, according to an exemplary embodiment of the present disclosure.

In order to test the exemplary cloaking devices, giving users the ability to cloak a "Liked" page (e.g., removing it from access by the predictive models) can be simulated. The exemplary logistic regression model can be trained after holding out a set of users that have a particular personality characteristic in question. The "Likes" can then be removed one at a time, in order of decreasing coefficient, or greatest decrease in probability, in the exemplary regression model. For non-linear models, other exemplary procedures can be used to order the "Likes" for cloaking The exemplary results are shown in graphs of FIGS. 3 and 4 which indicate that for 87% of users, initial classification probability drops by half within ten "Like" pages. This can indicate that for this personality characteristic (e.g., homosexuality); cloaking "Likes" could be effective for the majority of users. However, some users can find it harder to obtain a substantial drop in probability in this data, until more "Likes" can be cloaked (e.g., 20 or 25 "Likes"). In one example, the user can have a very large number of highly discriminative "Likes". (See, e.g., FIG. 3). In contrast, the graph of FIG. 4 demonstrates that for the low-IQ characteristic or an IQ less than or equal to 130, removing individual "Likes" can result in substantially smaller decreases in probability when compared to the homosexuality characteristic.

In order to facilitate the exemplary cloaking device, the user can set a threshold number (e.g., a probability threshold). The exemplary cloaking device can remove "Likes" from the user's profile until the probability of an inference being made can be at or below the set threshold. The user can set the threshold for various types of inferences (e.g., a threshold for sexuality and a threshold for IQ). Thresholds can also be set as a percentile (e.g., in what percent, high or low, do you fall as having the highest likelihood as compared with other users even if your overall probability can be low).

The foregoing exemplary analysis presumes that manipulating the predicted probability of having the personal characteristic can be the target for cloaking However, discriminative decisions can often be based on relative probabilities rather than their absolute magnitudes. It can be possible that very few individuals have a high estimated probability of having the personality characteristic, although if the individuals can be ranked by their likelihood of having the trait, then the true positives can be concentrated at the top of the ranked list. For example, in online display advertising, advertisers often target users most likely to convert, even though these users have conversion probabilities far less than 1.

To simulate using "Likes" as a way to target users, each user's probability of being positive can be calculated and turned it into a percentile relative to the population. Exemplary graphs of FIGS. 5A and 5B demonstrate how this percentile number can decrease as increasing numbers of "Likes" can be removed from individual users. Indeed, such graphs of FIGS. 5A and 5B show that, for example, the top decile of users predicted as most likely to have IQ above 130 stay within the top two deciles after removing up to 9 "Likes". In contrast, removing as few as a single "Like" can significantly change the exemplary model's prediction about a user's sexual orientation.

To further explore the differences in cloaking effectiveness, the predictive power of individual "Likes" across the entire population of users can be examined. Specifically:

(i) Do some traits have "Likes" that can be highly indicative whereas others can be populated with many non-discriminative ones?

(ii) Are traits characterized by many indicative "Likes", or are there a small number of telling ones?

Exemplary Network Inference

Network inference can make cloaking more difficult. The exemplary Facebook dataset includes friendship data, facilitating the reproduction of the social network among users, or at least a portion of the social network, where users can be the nodes and links can represent a friendship between two users. Network inference can be a set of procedures that can generate predictions about properties of the nodes by utilizing knowledge about the network. The phenomenon that social network data tends to exhibit relational autocorrelation in many characteristics has been previously examined.

This autocorrelation can be attributed to homophily (e.g., the likelihood of people with similar behavior to form ties with each other) or influence (e.g., the likelihood of someone's behavior to be influenced by his peers), and often both. Various exemplary approaches can be used to determine how the prediction of personal characteristics can be improved by using network inferences, and how it can affect the effectiveness of the exemplary "cloaking" system and method.

In the exemplary data, friendship data can be observed on a selective basis, and a friendship relationship may only be revealed if at least one of the two users chooses to share their friend list. As a result, the social network reproduced from the exemplary friendship data can have relatively few links (e.g., an average user has 15 friends in the network, whereas the median Facebook user has around 340 friends) and the degree distribution can be highly uneven.

The exemplary modeling can utilize two exemplary predictions for users that can satisfy the following exemplary: (i) the user has "Likes" data; and (ii) the user has at least five friends with Likes data. This can leave about 6,391 users for prediction, which can be denoted by U*.

A simple network inference process can be utilized. For example, a binary classification task can be considered. For example, Let $U^{train}$ be the set of users with known labels and Likes data, and $U^{test}$ * be the set of users with known labels. First, train an exemplary logistic regression model using $U^{train}$. This exemplary model can be the same model described above. Then, for $\in U^{test}$, find all friends of U with "Likes" data, and calculate a score for each of them using the exemplary logistic regression model above. Further, take the average of these scores as the predicted score for U, sort users in $U^{test}$ by the average scores and evaluate the exemplary model performance using a metric such as AUC. This exemplary procedure can be repeated five times using a cross-validation scheme with different $U^{train}$ and $U^{test}$.

The average AUC obtained using the procedure is shown in Table 3 below. Also shown is the AUC of the "Likes" model above. The results indicate that for some prediction tasks (e.g., homosexuality and IQ less than or equal to 130), a simple exemplary network inference model, even in the absence of the user's "Likes" data, can generate predictions equivalent to those of the exemplary "Likes" model. More sophisticated network inference models can achieve even better performance. Given that certain characteristics of a user can be effectively inferred by information about the user's friends, a comprehensive cloaking device can apply to one's friend list as well.

|  | Gender | Homosexuality | IQ >= 130 |
|---|---|---|---|
| Number of Samples | 6,348 | 1,648 | 292 |
| Likes Model AUC | 92 | 81 | 65 |
| Network Inference AUC | 57 | 78 | 65 |

The exemplary system, method and computer-accessible medium, according to an exemplary embodiment of the present disclosure, can be used in conjunction with a social networking website (e.g., Facebook) to determine which traits to remove so as to prevent drawing a particular inference about a user. For example, used in conjunction with the website's predictive engine (e.g., facilitating access to the predictive engine by the exemplary system, method and computer-accessible medium), the exemplary system, method and computer-accessible medium can determine which likes to remove based on the specific procedure or engine used by the website to draw inferences about a user.

The exemplary system, method and computer-accessible medium, according to an exemplary embodiment of the present disclosure, can also be used as or with a stand-alone application, utilizing a predictive engine that may not be specific to a website (e.g., can be applied to multiple websites). For example, the exemplary system, method and computer-accessible medium can be provided access to the information displayed on a social media website (e.g., a user of the social media website can grant access to all of their information on the website) to the exemplary system, method and computer-accessible medium. The exemplary system, method and computer-accessible medium can generate inferences utilizing a predictive engine, and provide a list of inferences that can be drawn about the user to the user. The exemplary system, method and computer-accessible medium, according to an exemplary embodiment of the present disclosure, can also provide one or more recommendations as to which information should be removed from the website in order to prevent the inference from being drawn. Thus, the exemplary system, method and computer-accessible medium does not have to access to the predictive engine specific to a particular website. For example, the user can grant access to multiple social media websites, and the exemplary system, method and computer-accessible medium can provide a recommendation for each website. Although the specific predictive engine used by a website can be different than the predictive engine used by the exemplary system, method and computer-accessible medium, the results of what can predicted by the exemplary system, method and computer-accessible medium can be sufficient to facilitate a recommendation of what to remove on a specific website having a different predictive engine.

Exemplary Privacy, Cloakability and the Evidence Counterfactual

Treatments of privacy in the analytics literature often focus on the issue of confidentiality of personal characteristics. (See e.g., References 12 and 16). However, with the rapid increase in the amount of social media data available, statistical inferences regarding personal characteristics can be drawing certain attention. (See, e.g., Reference 3). Prior publications have demonstrated the predictive power of information disclosed on Facebook to infer users' personal characteristics. (See, e.g., References 1, 8 and 15). The set of pages which users choose to "Like" on Facebook can predict their gender, religion, sexual or political orientation, and many more personal traits.

A recent study based on a survey of Facebook users indicated that users did not feel that they had the appropriate tools to mitigate their privacy concerns when it comes to social network data. (See, e.g., Reference 5). There can be evidence that when given the appropriate tools, people will trade off some of the benefits from social network activity to reduce their privacy concerns. (See, e.g., Reference 7). Besides being a conceptual tool to help with the analysis of control, the cloaking device can be a practical tool to achieve this exemplary goal.

The exemplary counterfactual evidence can be based on data-driven document classifications. (See e.g., Reference 10). Generalizing that work, consider any domain where the features taken as input can be seen as evidence for or against a particular non-default4 inference. In addition, in the increasingly common scenario (see, e.g., Reference 6) where there can be a vast number of possible pieces of evidence, any individual normally only exhibits a very small number of them, such as when drawing inferences from "Likes" on Facebook. (See, e.g., Reference 5). Thus, transparency can be provided by applying various methods (see e.g., Reference 10) to create one or more evidence counterfactual explanations for any non-default classification. For the exemplary results below, linear models can be considered, for which the procedure for computing the evidence counterfactual. (See, e.g., Reference 10).

An inference about an individual, and an evidence counterfactual explanation for why the inference was made, the exemplary core design, use and value of the exemplary cloaking device can be shown. The exemplary cloaking device can facilitate the individual to "cloak" particular evidence, for example, "Likes", from the inference procedure. Specifically, once a "Like" can be cloaked, the exemplary inference procedure can remove it from its input, and therefore treat the user as if she/he had not "Liked" this item. The evidence counterfactual can provide the user with a minimal or small set of "Likes" needed or preferred to cloak in order to change the inference made about him/her.

Figure 6:
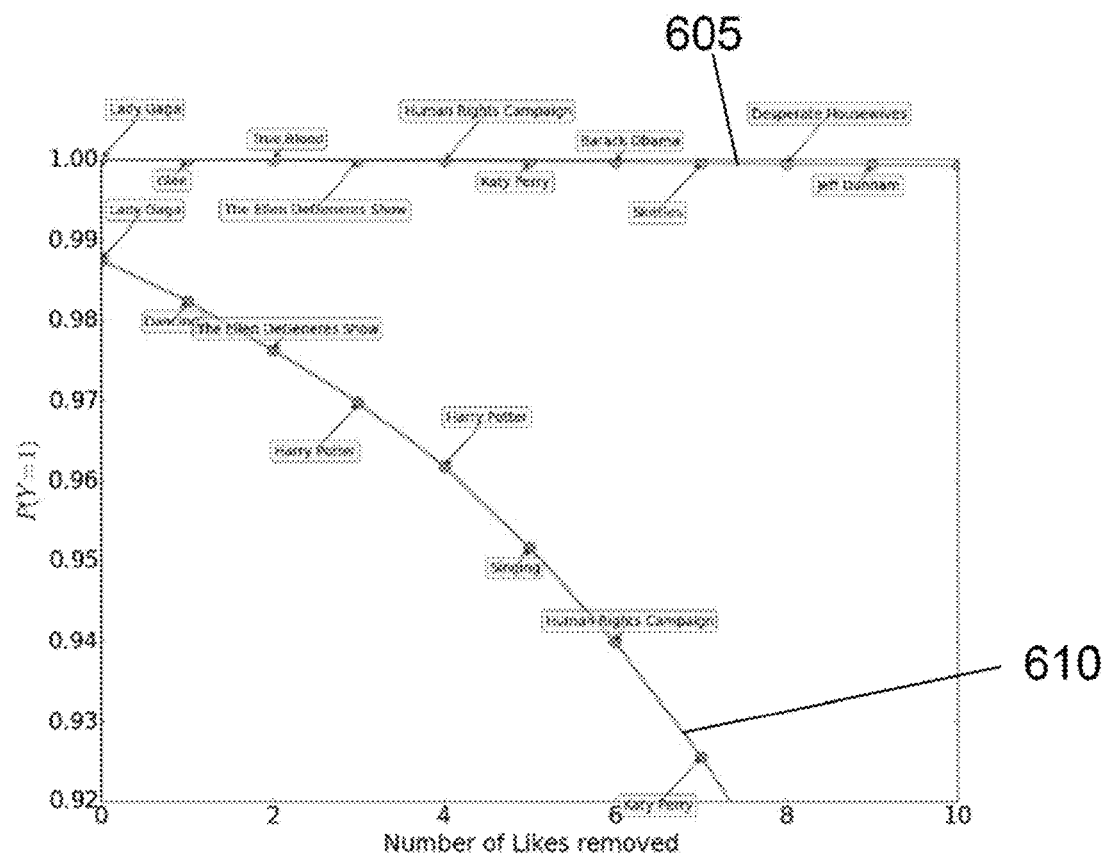
FIG. 6 is a graph illustrating the likelihood of a user having a particular orientation as a function of "Like" cloaking for two users according to an exemplary embodiment of the present disclosure.

Turning to the task of predicting whether or not a user can be gay using Facebook "Likes"—while the users may disclose who or what they are to friends and family, they may not wish to make this fact available to advertisers or others modeling online user behavior. Even more so, a user who is, e.g., not gay may take offense to having incorrect predictions made about him/her. FIG. 6 shows a graph of the information regarding two users (user 605 and user 610) and their probability of being gay as predicted by an exemplary inference procedure. As evidence can be removed by cloaking "Likes", it can be seen that while removing some number of "Likes" for one user can result in significant drops in predicted probability; however this trend may not be applicable for everyone.

The exemplary cloaking device, method and computer-accessible medium canthus have can have certain exemplary beneficial dimensions of value. First, they can facilitate a determination of the relationship between evidence and model-based inference, and thereby transparency and control, in various settings. Second, they can be implemented by and on social media sites, and others, to provide such transparency and control to its users.

Exemplary Cloaking Model

Described herein is the exemplary cloaking device, method and computer-accessible medium according to an exemplary embodiment of the present disclosure as implemented for the exemplary results shown below. The exemplary system, method and computer-accessible medium, according to an exemplary embodiment of the present disclosure, can also utilize minimum cost cloaking (e.g., a minimum cost cloaking value), in which the subset of evidence (e.g., "Likes") can be removed with minimal or reduced cost to the user. While the value each user can attach to each piece of information he reveals on the platform may not be known, uniformity can be assumed, quantifying the minimum or reduced amount of information to be removed not to be the target of a particular inference.

As described herein, the exemplary cloaking can be aset in the context of a predictive model used by an entity that can engage in digital user modeling and inference, for example, for targeting content or ads. A supervised classification or ranking task can be considered, which can be described by an exemplary linear model. (See, e.g., Reference 6). All of the features and targets in these exemplary models can be binary. In particular, for the exemplary model, various predictive modeling procedures, and use their data on predicting personal traits from Facebook "Likes", can be used. For example, the exemplary modeling procedure can reduce modeling dimensionality by computing the singular-value decomposition ("SVD") of the matrix of users and their "Likes", and choosing the top-100 SVD dimensions' vectors as the modeling dimensions. Then, logistic regression models on these dimensions can be formulated or otherwise generated using a specifically-programmed and configured computer to predict a variety of personal traits, as detailed below.

To simulate the inference procedure, it can be assumed that a positive inference can be drawn. For example, a user can be subject to targeting if the model can give him a score putting him in a particular top quantile ($\delta$) of the score distribution given by the predictive model. (See, e.g., Reference 7).

For example, let xij E x be an indicator equal to 1 if user i has "Liked" a piece of information j and 0 otherwise. For the SVD-logistic regression model described above, it can be converted it to an equivalent simple linear logistic regression model ("LRSVD") in these original features x, via the transformation described below. For the following, a simple linear (e.g., logistic) model can be considered.

For example, let $\beta_j$ be the coefficient in the linear model associated with feature $j \in \{1; \ldots ; J\}$. Without loss of generality, assume that these can be ranked by decreasing value of $\beta$. Each such coefficient can correspond to the marginal increase in a user's score if he chooses to "Like" feature j. Let $s_i$ be the linear model output score given to user i, which ranks users by their probability of having a characteristic s. It can be given by, for example:

$$s_i = \sum_{j=1}^{J} \beta_j x_{ij}. \qquad (1)$$

For example, the users for whom the positive inference can be made can be the "targeted" users. For a particular set of users, the cutoff score $s_\delta$ can be defined to be the score of the highest-ranked user in the quantile directly below the targeted users. Thus, the set of targeted, top-ranked users $T_s$ for classification task s can be, for example:

$$T_s = \{i | s_i > s_\delta\}. \qquad (2)$$

To analyze the difficulty or ease of cloaking for each user in the targeted group, "Likes" can be iteratively removed from a person's profile. This can be performed by continually subtracting from his/her score the feature which can have the largest coefficient given by the procedure. (See e.g., FIG. 6). A user can be considered to be successfully cloaked when his/her score can fall, e.g., below $s_\delta$. For example, a user can be removed from the targeted group by pushing another user in to take his place.

Figure 7:
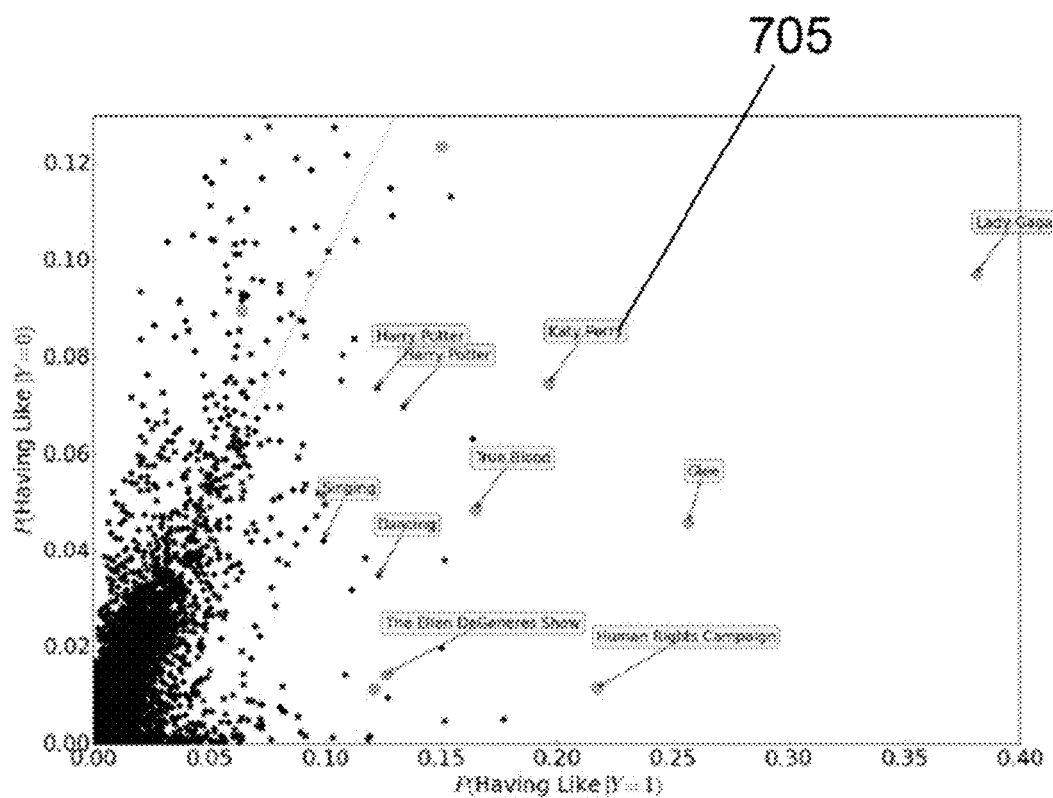
FIG. 7 is a graph illustrating exemplary indications of "Likes" on Facebook when determining if a user is gay according to an exemplary embodiment of the present disclosure.

FIG. 7 shows a graph in which the information regarding all "Like" pages associated with the task of predicting if individual users can be, e.g., gay. The ten points denoted by text labels (e.g., element 705) can be "Like" pages that have the largest coefficients from the LRSVD model. The top ten Like pages for user 605 illustrated in FIG. 6 are shown as points 705. Six out of this user's top The "Likes" overlap with the top ten for the entire task, as shown in FIG. 7. This highlighted user can be the user that the LRSVD model predicts as having the highest probability of being gay.

To quantify "Like" removal and the difficulty of cloaking, $\eta_{i, \delta}^s$ can be the effort to cloak user i from the top $\delta$-% of the score distribution for a characteristic s. This is shown in Procedure 1 below.

All else equal, the effort to cloak a user goes down when (i) the coefficients of his removed features go up, (ii) the threshold score goes up and/or (iii) his score goes down. The absolute effort to cloak a classification tasks can be given by averaging ηi, s, δ across users in $T_s$. Thus, for example:

$$\eta_\delta^s = \frac{\sum_{i \in T_s} \eta_{i,\delta}^s}{|T_s|}. \quad (3)$$

Alternatively or in addition, the relative effort to cloak a task for user i can be defined by normalizing their absolute effort by the quantity of information they reveal, for example:

$$\pi_{i,\delta}^s = \frac{\eta_{i,\delta}^s}{\sum_{j=1}^{J} x_{ij}}. \quad (4)$$

The relative effort to cloak a classification task s can be defined by averaging this measure across users in $T_s$. Thus, for example:

$$\pi_\delta^s = \frac{\sum_{i \in T_s} \pi_{i,\delta}^s}{|T_s|}. \quad (5)$$

Below, δ=0.90 can be used to indicate that the top 10% of users can be trying to avoid being targeted.

Procedure 1: Procedure to determine the amount of effort needed to cloak users for a particular predictive task.

---
$\eta_{i,\delta}^s \leftarrow 0$
$j \leftarrow 1$
Sort coefficients β from 1...J
while $s_i > s_\delta$ do
| $s_i \leftarrow s_i - \beta_j$
| $\eta_{i,\delta}^s \leftarrow \eta_{i,\delta}^s + 1$
| $j \leftarrow j + 1$
end
---

Further Exemplary Data

The exemplary data was collected through a Facebook application called my Personality. (See e.g., Reference 9). Such exemplary data contains information on 164,883 individuals from the United States, including their responses to survey questions and a subset of their Facebook profiles. Users can be characterized by their sexual orientation, gender, political affiliation, religious view, IQ, alcohol and drug consumption behavior, social network structure, lifestyle, as well as their Facebook "Likes." (See, e.g., Reference 10).

Some personal characteristics were directly extracted from users' Facebook profiles, whereas others were collected by survey. Thus, the number of instances for the different target variables can differ. Binary variables can be kept without change. Variables that fall on a Likert scale can be separated into two groups, users that have the largest Likert value and users that have any other value. Continuous variables can be represented as binary variables using the 90th percentile as a cutoff. Multi-category variables can be subsampled to only include the two most frequent categories, with the instances representing the other categories discarded for the corresponding inference task. For example, feature data can be sparse; for example, for each characteristic users, it may only display less than 0.5% of the set of Likes on average. Table 4 below presents some summary statistics of the data.

TABLE 4

Summary statistics of the dataset. Number of Likes indicates how many unique Like pages are associated with a given task. Percent positive are how many positive instances there are for each task. Average Likes indicates the average number of Likes a user associated with the given task has.

|  | Number Users | Number Likes | % Positive | Average Likes |
| --- | --- | --- | --- | --- |
| age ≥37 | 145400 | 179605 | 0.127 | 216 |
| agreeableness ≥5 | 136974 | 179440 | 0.014 | 218 |
| conscientiousness ≥5 | 136974 | 179440 | 0.018 | 218 |
| extraversion ≥5 | 136974 | 179440 | 0.033 | 218 |
| iq ≥130 | 4540 | 136289 | 0.130 | 186 |
| iq <90 | 4540 | 136289 | 0.073 | 186 |
| is democrat | 7301 | 127103 | 0.596 | 262 |
| is drinking | 3351 | 118273 | 0.485 | 262 |
| is female | 164285 | 179605 | 0.616 | 209 |
| is gay | 22383 | 169219 | 0.046 | 192 |
| is Homosexual | 51703 | 179182 | 0.035 | 257 |
| is lesbian | 29320 | 175993 | 0.027 | 307 |
| is muslim | 11600 | 148043 | 0.050 | 238 |
| is single | 124863 | 179605 | 0.535 | 226 |
| is smoking | 3376 | 113321 | 0.237 | 261 |
| life satisfaction ≥6 | 5958 | 141110 | 0.125 | 252 |
| network density ≥65 | 32704 | 178737 | 0.012 | 214 |
| neuroticism ≥5 | 136974 | 179440 | 0.004 | 218 |
| num friends ≥585 | 32704 | 178737 | 0.140 | 214 |
| openness ≥5 | 136974 | 179440 | 0.043 | 218 |
| ss belief = 1 | 13900 | 169487 | 0.178 | 229 |
| ss belief = 5 | 13900 | 169487 | 0.079 | 229 |
| uses drugs | 2490 | 105001 | 0.172 | 264 |

Exemplary Classification Tasks

The top 100 components of a SVD of users' Facebook Likes can be used in the LRSVD. (See e.g., Reference 9). Following an implementation of the exemplary model, and the growing trend of using dimensionality reduction techniques on datasets similar to this one, exemplary cloaking can be implemented on top of the exemplary LRSVD model. For each exemplary model, the regularization parameter can be selected by five-fold cross validation. The AUC can be high across classification tasks and models and, can resemble previously shown results. (See e.g., Reference 9).

Exemplary Effort to Cloak

Figure 8:
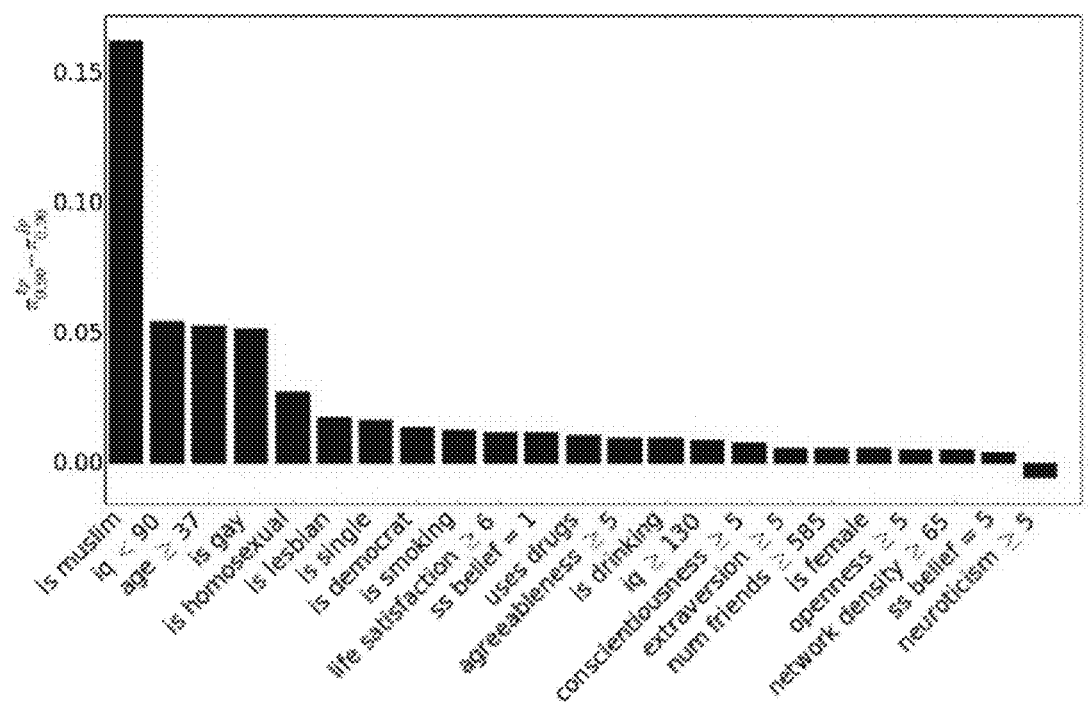
FIG. 8 is a chart illustrating a difference in cloaking for true positive and false positive users using the exemplary simple linear logistic regression model according to an exemplary embodiment of the present disclosure.

Table 5 below summarizes the cloaking of different classification tasks when using the exemplary LRSVD model. In addition to measuring the cloakability of users in the targeted group, targeted users can be separated into the true positive ("TP") set and false positive ("FP") set. For example, a trend can be found where cloaking can generally be more difficult for TP users when compared to the set of all users. FP users can find that the cloaking can be easier than either of the other two groups, a trend which is seen, for example, in FIG. 8. The exemplary performance of a an exemplary logistic regression model can be improved by reducing the set of features, if this set can be very large or if the data can be sparse. A common technique can be to use the exemplary SVD.

For example, let M be a feature matrix which contains n records and m features. Let β be the set of coefficients from a LR model. M can be decomposed into, for example:

$$M = U\Sigma V. \quad (6)$$

To reduce the space, only a subset of k features from the matrix Σ in the LRSVD model can be included. The exemplary LRSVD model may not yield coefficients for each original feature. However, its coefficients can be mapped into coefficients for each original feature. This can be done by, for example:

$$\beta = \beta_{SVD} \Sigma^{-1} V, \quad (7)$$

where βSVD can be the coefficients of the SVD components.

TABLE 5

This table presents the effort to cloak different users' characteristics using the LRSVD model. Absolute efforts are presented in the left panel and relative efforts are in the right panel. For each panel, the full set of users in the first column can be considered, only the true positive users in the second column and over the true negative users in the third column.

|  | $\pi_{0.9}$ | | | $\eta_{0.9}$ | | |
| --- | --- | --- | --- | --- | --- | --- |
|  | All | TP | FP | All | TP | FP |
| is democrat | 0.017 | 0.017 | 0.003 | 8.462 | 8.533 | 2.000 |
| is female | 0.019 | 0.019 | 0.013 | 9.971 | 10.015 | 5.475 |
| extraversion ≥ 5 | 0.019 | 0.024 | 0.018 | 4.428 | 5.944 | 4.300 |
| is lesbian | 0.019 | 0.035 | 0.017 | 3.075 | 5.437 | 2.829 |
| is drinking | 0.020 | 0.022 | 0.012 | 6.771 | 7.463 | 3.875 |
| num friends ≥ 585 | 0.021 | 0.025 | 0.019 | 5.043 | 6.556 | 4.197 |
| ss belief = 5 | 0.021 | 0.025 | 0.021 | 8.251 | 11.098 | 7.760 |
| network density ≥ 65 | 0.021 | 0.026 | 0.021 | 10.545 | 15.308 | 10.388 |
| neuroticism ≥ 5 | 0.022 | 0.016 | 0.022 | 9.140 | 5.667 | 9.173 |
| life satisfaction ≥ 6 | 0.022 | 0.032 | 0.020 | 5.128 | 7.214 | 4.642 |
| openness ≥ 5 | 0.023 | 0.028 | 0.023 | 6.674 | 7.677 | 6.571 |
| agreeableness ≥ 5 | 0.023 | 0.033 | 0.023 | 4.985 | 6.508 | 4.957 |
| is homosexual | 0.024 | 0.047 | 0.019 | 3.493 | 6.572 | 2.888 |
| uses drugs | 0.027 | 0.033 | 0.022 | 12.161 | 12.143 | 12.176 |
| is smoking | 0.028 | 0.032 | 0.019 | 8.357 | 9.800 | 5.621 |
| iq ≥ 130 | 0.028 | 0.035 | 0.026 | 6.566 | 3.429 | 7.283 |
| ss belief = 1 | 0.029 | 0.036 | 0.024 | 5.738 | 6.880 | 4.946 |
| is single | 0.034 | 0.038 | 0.021 | 13.665 | 15.514 | 7.888 |
| is gay | 0.038 | 0.074 | 0.022 | 5.653 | 10.944 | 3.161 |
| conscientiousness ≥ 5 | 0.039 | 0.047 | 0.039 | 4.746 | 6.746 | 4.670 |
| iq < 90 | 0.045 | 0.090 | 0.035 | 6.867 | 16.318 | 4.582 |
| age ≥ 37 | 0.077 | 0.097 | 0.044 | 10.259 | 13.011 | 5.847 |
| is muslim | 0.096 | 0.202 | 0.039 | 11.706 | 27.804 | 2.930 |
| Mean | 0.031 | 0.045 | 0.023 | 7.465 | 9.851 | 5.572 |
| Median | 0.023 | 0.033 | 0.021 | 6.771 | 7.677 | 4.946 |

Figure 9:
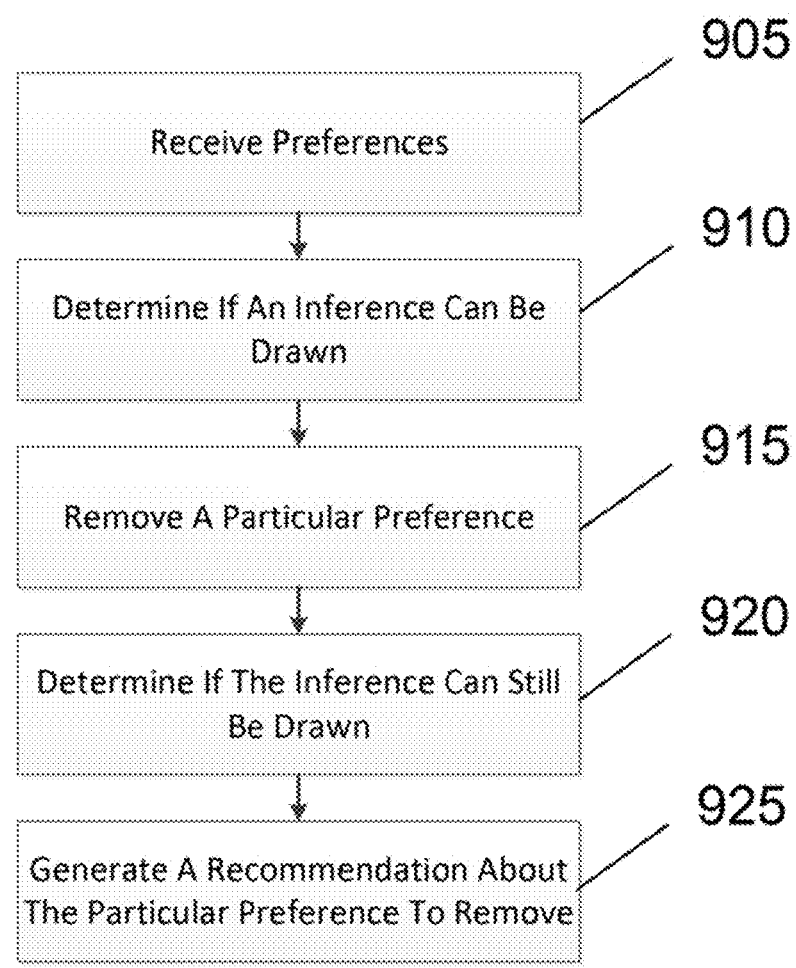
FIG. 9 is a flow diagram of a method for generating a recommendation regarding a preference of a user to remove according to an exemplary embodiment of the present disclosure using a specifically-programmed and modified computer.

FIG. 9 illustrates a method 900 for generating a recommendation about a preference of a user to remove according to an exemplary embodiment of the present disclosure, e.g., using a specifically-programmed and configured computer. For example, at procedure 905, information about the preferences of a user can be received. At procedure 910, the exemplary system, method and computer-accessible medium can determine if one or more inferences about the user can be drawn based on their preferences. At procedure 915, the exemplary system, method and computer-accessible medium can remove one or more particular preferences about the user, and then determine, at procedure 920, if the one or more inferences can still be drawn. At procedure 925 the exemplary system, method and computer-accessible medium can provide a recommendation to the user about which preferences to remove to prevent the one or more inferences from being drawn about the user.

Figure 10:
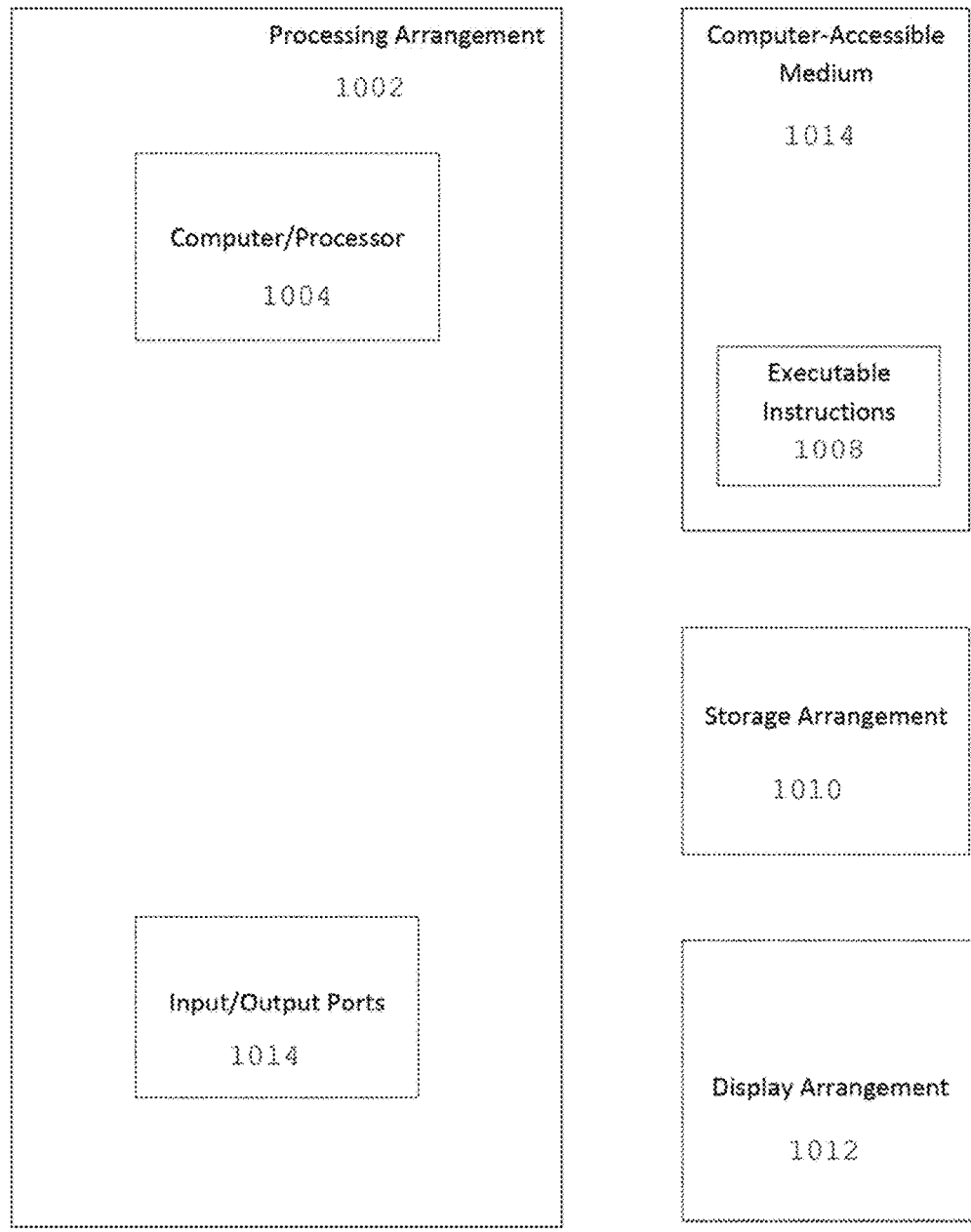
FIG. 10 is an illustration of an exemplary block diagram of an exemplary system in accordance with certain exemplary embodiments of the present disclosure.

FIG. 10 shows a block diagram of an exemplary embodiment of a system according to the present disclosure. For example, exemplary procedures in accordance with the present disclosure described herein can be performed by a processing arrangement and/or a computing arrangement 1002. Such processing/computing arrangement 1002 can be, for example entirely or a part of, or include, but not limited to, a computer/processor 1004 that can include, for example one or more microprocessors, and use instructions stored on a computer-accessible medium (e.g., RAM, ROM, hard drive, or other storage device).

As shown in FIG. 10, for example a computer-accessible medium 1006 (e.g., as described herein above, a storage device such as a hard disk, floppy disk, memory stick, CD-ROM, RAM, ROM, etc., or a collection thereof) can be provided (e.g., in communication with the processing arrangement 1002). The computer-accessible medium 1006 can contain executable instructions 1008 thereon. In addition or alternatively, a storage arrangement 1010 can be provided separately from the computer-accessible medium 1006, which can provide the instructions to the processing arrangement 1002 so as to configure the processing arrangement to execute certain exemplary procedures, processes and methods, as described herein above, for example.

Further, the exemplary processing arrangement 1002 can be provided with or include an input/output arrangement 1014, which can include, for example a wired network, a wireless network, the internet, an intranet, a data collection probe, a sensor, etc. As shown in FIG. 10, the exemplary processing arrangement 1002 can be in communication with an exemplary display arrangement 1012, which, according to certain exemplary embodiments of the present disclosure, can be a touch-screen configured for inputting information to the processing arrangement in addition to outputting information from the processing arrangement, for example. Further, the exemplary display 1012 and/or a storage arrangement 1010 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

EXEMPLARY REFERENCES

The following references are hereby incorporated by reference in their entirety.

[1] Bachrach, Y., Kosinski, M., Graepel, T., Kohli, P., and Stillwell, D. Personality and patterns of facebook usage. In proceedings of the 3rd annual ACM web science conference (2012), ACM, pp. 24-32.

[2] Barocas, S. Panic Inducing: Data Mining, Fairness, and Privacy. Phd dissertation, New York University, 2014.

[3] Harald Schoen, Daniel Gayo-Avello, P. T. M. E. M. M. S. P. G. The power of prediction with social media. Internet Research, Vol. 23 Iss: 5, pp. 528-543, (2013).

[4] House, W. Consumer data privacy in a networked world: A framework for protecting privacy and promoting innovation in the global economy. Washington, D.C.: White House.

[5] Johnson M., E. S., and M., B. S. Facebook and privacy: It's complicated. Symposium On Usable Privacy and Security (SOUPS), July 2012.

[6] Junque de Fortuny, E., Martens, D., and Provost, F. Predictive modeling with big data: is bigger really better? Big Data 1, 4 (2013), 215-226.

[7] Knijnenburg B. P., Kobsa S. M., J. H. Counteracting the negative effect of form auto-completion on the privacy calculus. Thirty Fourth International Conference on Information Systems, Milan 2013.

[8] Kosinski, M., Stillwell, D., and Graepel, T. Private traits and attributes are predictable from digital records of human behavior. Proceedings of the National Academy of Sciences 110, 15 (2013), 5802-5805.

[9] Kosinski M., Stillwell D., G. T. Private traits and attributes are predictable from digital records of human behavior. Proceedings of the National Academy of Sciences (2013).

[10] Martens, D., and Provost, F. Explaining documents' predicted classifications. MIS Quarterly 38(1), 73-99, 2014.

[11] Martens, D., and Provost, F. Explaining documents' predicted classifications. MIS Quarterly 38(1), 73-99, 2014.

[12] Pavlou, P. A. State of the information privacy literature: where are we now and where should we go. MIS quarterly 35, 4 (2011), 977-988.

13] Perlich, C., Dalessandro, B., Raeder, T., Stitelman, O., and Provost, F. Machine learning for targeted display advertising: Transfer learning in action. Machine learning 95, 1 (2014), 103-127.

[14] Perlich, C., Dalessandro, B., Raeder, T., Stitelman, O., and Provost, F. Machine learning for targeted display advertising: Transfer learning in action. Machine learning 95, 1 (2014), 103-127.

[15] Schwartz, H. A., Eichstaedt, J. C., Kern, M. L., Dziurzynski, L., Ramones, S. M., Agrawal, M., Shah, A., Kosinski, M., Stillwell, D., Selig-man, M. E., et al. Personality, gender, and age in the language of social media: The open-vocabulary approach. PloS one 8, 9 (2013), e73791.

[16] Smith, H. J., Dinev, T., and Xu, H. Information privacy research: an interdisciplinary review. MIS quarterly 35, 4 (2011), 989-1016.

What is claimed is:

1. A non-transitory computer-accessible medium having stored thereon computer-executable instructions for managing a plurality of preferences associated with at least one user, wherein, when a computer hardware arrangement executes the instructions, the computer arrangement is configured to perform procedures comprising:
    receiving information related to the preferences;
    determining if at least one inference about the at least one user is drawn from the preferences to generate further data;
    removing at least one particular preference from the preferences based on the further data; and
    further determining if the at least one inference continues to be drawn.

2. The computer-accessible medium of claim 1, wherein the preferences include inference preferences used in at least one inference procedure.

3. The computer-accessible medium of claim 1, wherein the computer arrangement is further configured to generate a recommendation for the at least one user to remove the at least one particular preference if the at least one inference continues to be drawn.

4. The computer-accessible medium of claim 1, wherein the preferences includes a plurality of likes of at least one content.

5. The computer-accessible medium of claim 1, wherein the at least one inference includes at least one of a gender, a sexuality, or an intelligence quotient.

6. The computer-accessible medium of claim 1, wherein the computer arrangement is further configured to determine if the at least one inference is drawn using a predictive model.

7. The computer-accessible medium of claim 6, wherein the predictive model includes a logistic regression model.

8. The computer-accessible medium of claim 7, wherein the logistic regression model have regressors which include the preferences associated with the at least one user.

9. The computer-accessible medium of claim 7, wherein the predictive model includes at least one of (i) at least one support vector machine, (ii) at least one neural network, (iii) at least one tree-structured model, (iv) at least one rule-based model or (v) at least one Bayesian model.

10. The computer-accessible medium of claim 1, wherein the removing procedure includes removing a plurality of particular preferences, one at a time, until the at least one inference is no longer drawn.

11. The computer-accessible medium of claim 10, the computer arrangement is further configured to select the particular preferences based on a minimum cost cloaking value.

12. The computer-accessible medium of claim 11, wherein the computer arrangement is further configured to determine the minimum cost cloaking value based on a cost to the user of the particular preferences.

13. The computer-accessible medium of claim 1, wherein the computer arrangement is further configured to determine the at least one inference based on at least one matrix of a plurality of users and a plurality of respective preferences.

14. The computer-accessible medium of claim 13, wherein the computer arrangement is further configured to determine the at least one inference based on a singular-value decomposition (SVD) of the at least one matrix.

15. The computer-accessible medium of claim 14, wherein the computer arrangement is further configured to determine the at least one inference by selecting a particular number of SVD dimension vectors as modeling dimensions.

16. The computer-accessible medium of claim 15, wherein the computer arrangement is further configured to determine the at least one inference based on at least one logistic regression model that uses the particular number of the SVD dimensions.

17. The computer-accessible medium of claim 14, wherein the computer arrangement is further configured to convert the at least one logistic regression model into a simple linear logistic regression model that uses the respective preferences.

18. The computer-accessible medium of claim 1, wherein the preferences include information posted on at least one social networking website.

19. The computer-accessible medium of claim 18, wherein the information is at least one of (i) privately available only to the at least one social networking website, (ii) publically available or (iii) partially publically available.

20. The computer-accessible medium of claim 1, wherein the computer arrangement is further configured to receive a selection of at least one particular preference to be removed from the preferences.

21. A method for managing a plurality of preferences associated with at least one user, comprising:
  receiving information related to the preferences;
  determining if at least one inference about the at least one user is drawn from the preferences to generate further data;
  removing at least one particular preference from the preferences based on the further data; and
  using a specifically-programmed computer hardware arrangement, further determining if the at least one inference continues to be drawn.

22. A system for managing a plurality of preferences associated with at least one user, comprising:
  at least one computer hardware arrangement configured to:
    receive information related to the preferences;
    determine if at least one inference about the at least one user is drawn from the preferences to generate further data;
    remove at least one particular preference from the preferences based on the further data; and
    further determine if the at least one inference continues to be drawn.

* * * * *